United States Patent
Mansour

(10) Patent No.: US 9,615,540 B1
(45) Date of Patent: Apr. 11, 2017

(54) DISPENSING SYSTEM FOR PROVIDING FOOD AND WATER TO A PET IN AN AUTOMOBILE

(71) Applicant: Farhad Mansour, Encino, CA (US)

(72) Inventor: Farhad Mansour, Encino, CA (US)

(*) Notice: Subject to any disclaimer, the term of this patent is extended or adjusted under 35 U.S.C. 154(b) by 420 days.

(21) Appl. No.: 14/033,417

(22) Filed: Sep. 20, 2013

Related U.S. Application Data

(60) Provisional application No. 61/704,460, filed on Sep. 22, 2012.

(51) Int. Cl.
*A01K 5/01* (2006.01)
*A01K 5/00* (2006.01)
*A01K 7/00* (2006.01)

(52) U.S. Cl.
CPC . *A01K 5/00* (2013.01); *A01K 7/00* (2013.01)

(58) Field of Classification Search
CPC ........ A01K 5/00; A01K 39/00; A01K 5/0114; A01K 5/01
USPC .. 119/52.1, 51.01, 51.5, 57, 58, 61.5, 61.56, 119/57.3, 57.4, 57.5, 57.6, 61.57, 74; 297/118, 188.2, 188.06, 217.1; 248/311.2, 311.3
See application file for complete search history.

(56) References Cited

U.S. PATENT DOCUMENTS

| | | | |
|---|---|---|---|
| D229,074 S * | 11/1973 | Cuprak | 119/61.5 |
| 4,436,056 A | 3/1984 | MacLeod | |
| 5,105,768 A * | 4/1992 | Johnson | A01K 7/005 119/61.56 |
| 5,144,912 A * | 9/1992 | Hammett | A01K 7/00 119/51.5 |
| 5,433,171 A * | 7/1995 | Ewell | A01K 5/0291 119/51.5 |
| 5,501,176 A * | 3/1996 | Tully | A01K 5/0114 119/61.57 |
| 5,584,263 A * | 12/1996 | Sexton | A01K 5/0114 119/51.5 |
| 6,408,787 B1 * | 6/2002 | Clark | A01K 5/0275 119/51.01 |
| 6,409,137 B1 * | 6/2002 | Tran | A47C 7/68 206/549 |
| 6,457,772 B1 * | 10/2002 | Forston | A47C 7/62 297/188.04 |
| 6,681,718 B1 * | 1/2004 | McIlarky | A01K 5/0291 119/51.11 |
| 6,684,815 B1 * | 2/2004 | Rakoczy | A01K 7/00 119/72 |

(Continued)

*Primary Examiner* — Trinh Nguyen
(74) *Attorney, Agent, or Firm* — LaMorte & Associates, P.C.

(57) ABSTRACT

A dispensing system for dispensing water and/or food to a pet that is confined in an automobile. A backboard is attached to the rear of a vehicle's seat using suspension elements. At least one storage container is mounted to the backboard. A tray is positioned under the storage containers. The tray holds a bowl for each storage container. The tray is also attached to the backboard. The bowls receive the dispensed water and/or food dispensed from the storage containers. The bowls are specially formed to minimize spillage in an automobile. Each bowl is annular in shape. As such, each bowl has a central opening. When water or food fills a bowl, any overflow or spillage flows into the central opening. Under the bowls, the spillage is captured by receptacles in the underlying tray.

19 Claims, 5 Drawing Sheets

(56) References Cited

U.S. PATENT DOCUMENTS

| | | | | |
|---|---|---|---|---|
| 7,533,860 | B2* | 5/2009 | Somuah | B60N 3/102 |
| | | | | 206/217 |
| 7,913,647 | B1* | 3/2011 | Martin | A01K 5/0114 |
| | | | | 119/52.1 |
| 7,971,552 | B1* | 7/2011 | Rakoczy | A01K 5/0114 |
| | | | | 119/72 |
| 8,424,825 | B2* | 4/2013 | Somuah | B60R 11/0235 |
| | | | | 248/130 |
| 8,776,725 | B1* | 7/2014 | Grijalva | A01K 5/0114 |
| | | | | 119/51.01 |
| 2006/0065199 | A1* | 3/2006 | Davis | A01K 39/012 |
| | | | | 119/51.01 |
| 2006/0278169 | A1* | 12/2006 | Logan | A01K 7/00 |
| | | | | 119/61.56 |
| 2008/0011234 | A1* | 1/2008 | Wilkes | B60R 7/043 |
| | | | | 119/28.5 |
| 2008/0023479 | A1* | 1/2008 | Sadriwalla | A01K 5/0114 |
| | | | | 220/480 |
| 2010/0122660 | A1* | 5/2010 | Willett | A01K 7/00 |
| | | | | 119/51.5 |
| 2012/0186497 | A1* | 7/2012 | Spano | A01K 5/0135 |
| | | | | 108/26 |
| 2013/0061809 | A1* | 3/2013 | Jenkins | A01K 5/0225 |
| | | | | 119/52.1 |
| 2014/0058559 | A1* | 2/2014 | Haynes | A01K 5/0114 |
| | | | | 700/232 |
| 2014/0083364 | A1* | 3/2014 | Anderson | A01K 5/01 |
| | | | | 119/51.01 |

* cited by examiner

DISPENSING SYSTEM FOR PROVIDING FOOD AND WATER TO A PET IN AN AUTOMOBILE

RELATED APPLICATIONS

This application claims the benefit of U.S. Provisional Patent Application No. 61/704,460 filed Sep. 22, 2012.

BACKGROUND OF THE INVENTION

1. Field of the Invention

In general, the present invention relates to systems and methods of providing food and/or water to a pet located in the rear seat of an automobile. More particularly, the present invention relates to food and/or water dispensing systems for pets that have anti-spill features.

2. Prior Art Description

Many pet owners occasionally travel with their pets in an automobile. Often the trip with the pet is a short trip, such as a trip to the veterinarian. However, pets sometimes travel with their owners for much longer trips. As such, the time a pet spends in an automobile can be substantial. The time a pet spends in an automobile is often compounded by the fact that pets are often left in the automobile once a pet owner reaches a destination. For instance, a pet owner may take his/her pet on a short drive to a local store. However, once at the store, the pet is left in the parked automobile. As such, the pet may spend hours in an automobile as the pet owner travels doing short daily chores.

When a pet is left in an automobile for any substantial period of time, it is very important that the pet be supplied with a source of water. If the pet is left in an automobile for long periods, the pet should also be left with food. Pets can dehydrate very quickly within the confines of an automobile. The inside of an automobile is typically hotter than the ambient environment. Furthermore, pets quickly dehydrate from having their noses outside the vehicle's windows as the vehicle is traveling.

Providing water and food to a pet in a moving automobile can be messy. In an automobile, water and food are affected by the various turns, accelerations and decelerations of the automobile. As such, any water or food left in a bowl tends to quickly spill into the vehicle. Furthermore, both the pet and the bowls are affected by the same forces as are the bowl's contents. This causes both the pets and bowls to unexpectedly move within the automobile. This also contributes to the rapid spilling of food and water in an automobile.

In the prior art, there are bowls that have features that prevent a pet from accidentally tipping the bowl. However, these features assume that the bowl will be set on a flat, stationary surface. The features usually include a bowl with a wide base and a restricted top opening. Such prior art is exemplified by U.S. Pat. No. 4,436,056 to MacLeod. However, such features do not prevent a bowl from moving back and forth within a speeding automobile. Furthermore, such features do not provide a continuous source of water and/or food to a pet restricted within the confines of an automobile.

A need therefore exists for a dispensing system for water and/or food with specialized bowls that is designed to be used within a moving automobile. The dispensing system must prevent spillage due to movements of the automobile and the pet. The dispensing system must also be able to easily supply water and/or food as needed to a traveling pet within the automobile. These needs are met by the present invention as described and claimed below.

SUMMARY OF THE INVENTION

The present invention is a dispensing system for dispensing water and/or food to a pet that is confined in an automobile. The dispensing system utilizes a portable backboard. The backboard is attached to the rear of a vehicle's seat using suspension elements.

At least one storage container is mounted to the backboard. Each storage container can be filled with water or dry food. Each storage container has a dispensing opening that is gravity fed at the bottom of the storage container.

A tray is positioned under the storage containers. The tray holds a bowl for each storage container. The tray is also attached to the backboard. The bowls receive the dispensed water and/or food dispensed from the storage containers.

The bowls are specially formed to minimize spillage in an automobile. Each bowl is annular in shape. As such, each bowl has a central opening. When water or food fills a bowl, any overflow or spillage flows into the central opening. Under the bowls, the spillage is captured by receptacles in the underlying tray. The tray connects the bowls to the backboard. The backboard connects the tray to the vehicle. As such, the tray and bowls move with the vehicle and spill less. Any spillage that does occur is captured by the tray. In this manner water and/or food does not wet or dirty the interior of the automobile.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention distribution system can be embodied in many ways, only selected exemplary embodiments are shown. These embodiments are selected in order to set forth some of the best modes contemplated for the invention. The illustrated embodiments, however, are merely exemplary and should not be considered a limitation when interpreting the scope of the appended claims.

Figure 1:
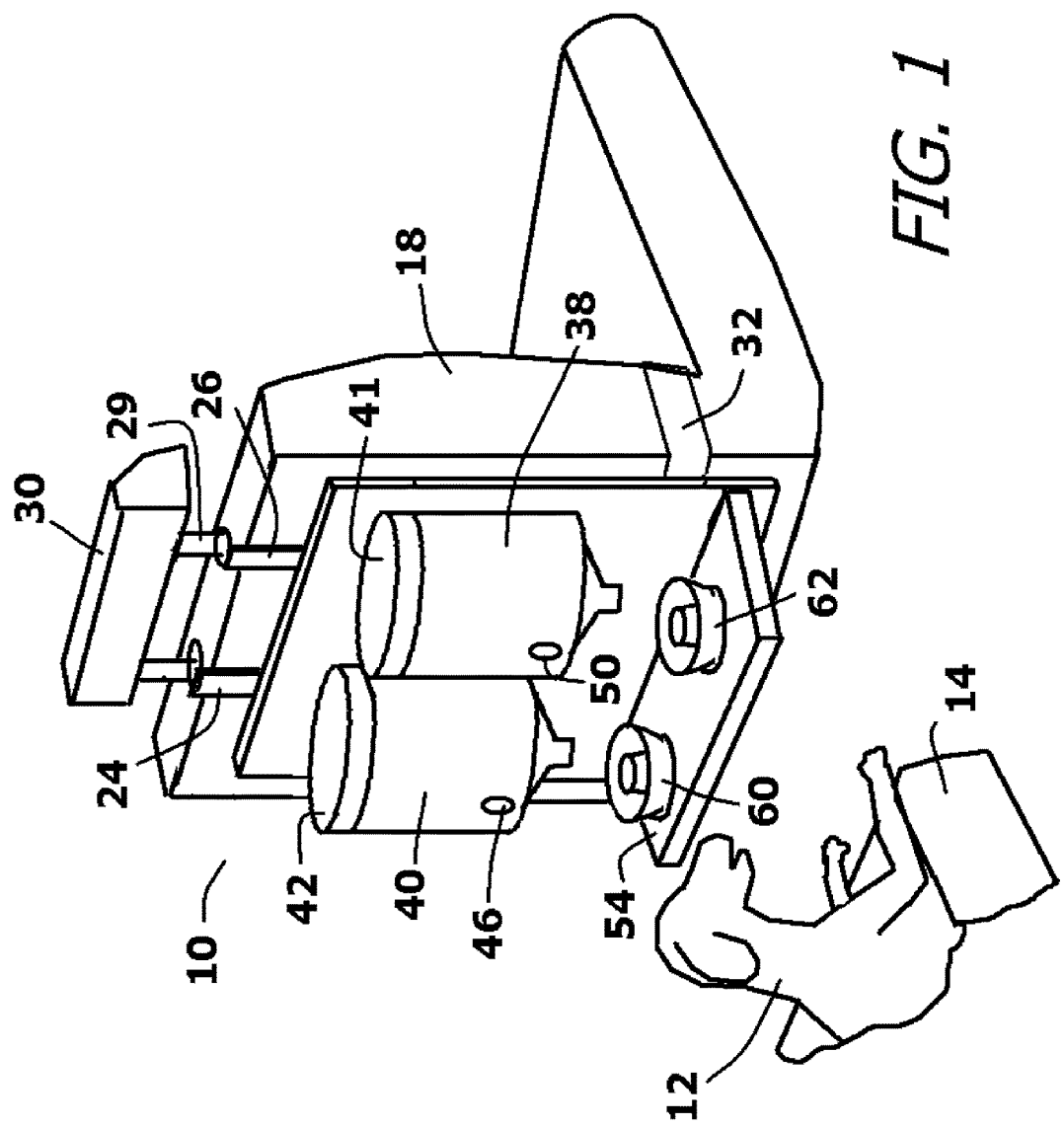
FIG. 1 is a perspective view of an exemplary embodiment of the present invention distribution system installed to face the rear seats of an automobile.
Figure 2:
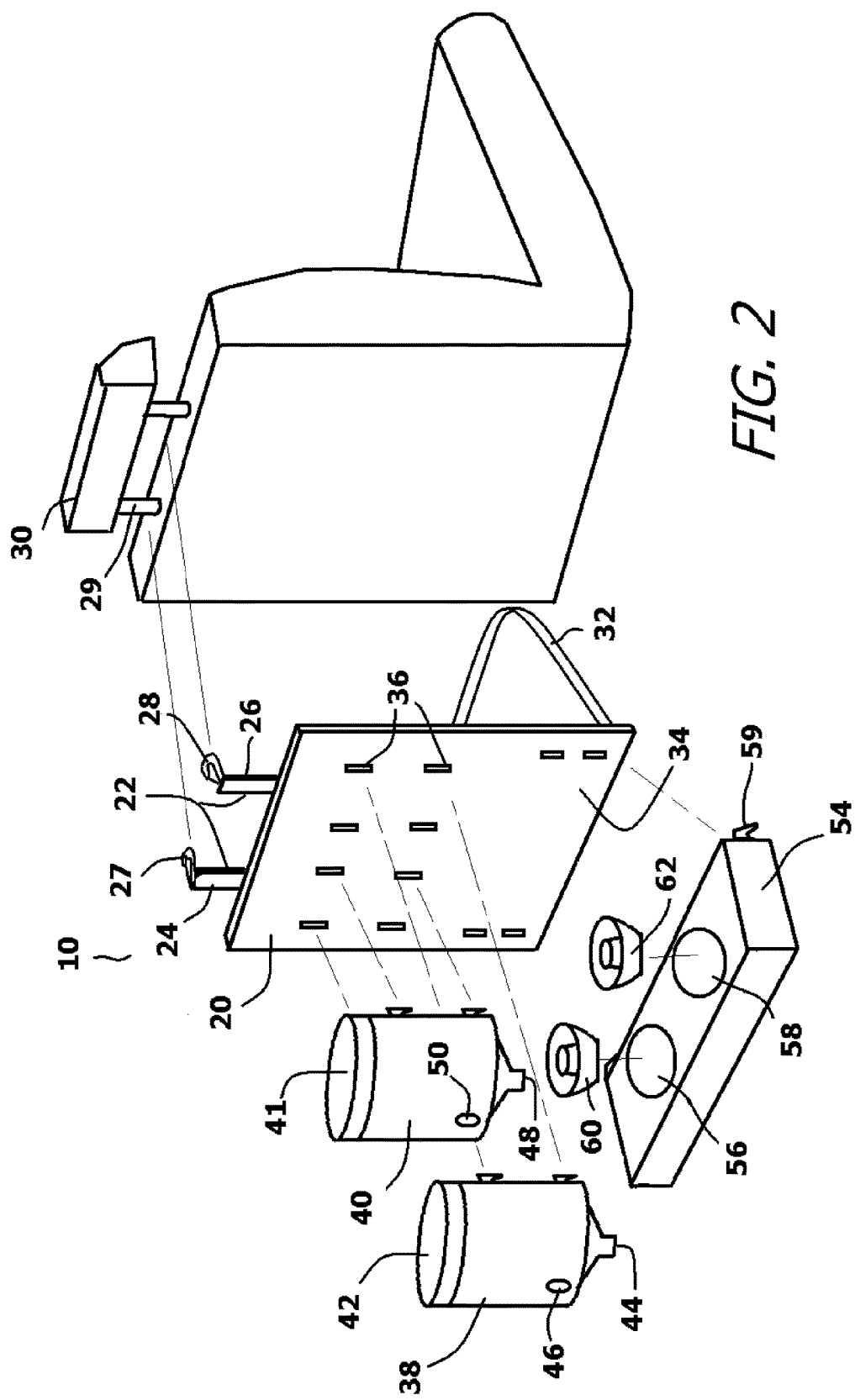
FIG. 2 is an exploded view of the exemplary distribution system shown in FIG. 1.
Figure 3:
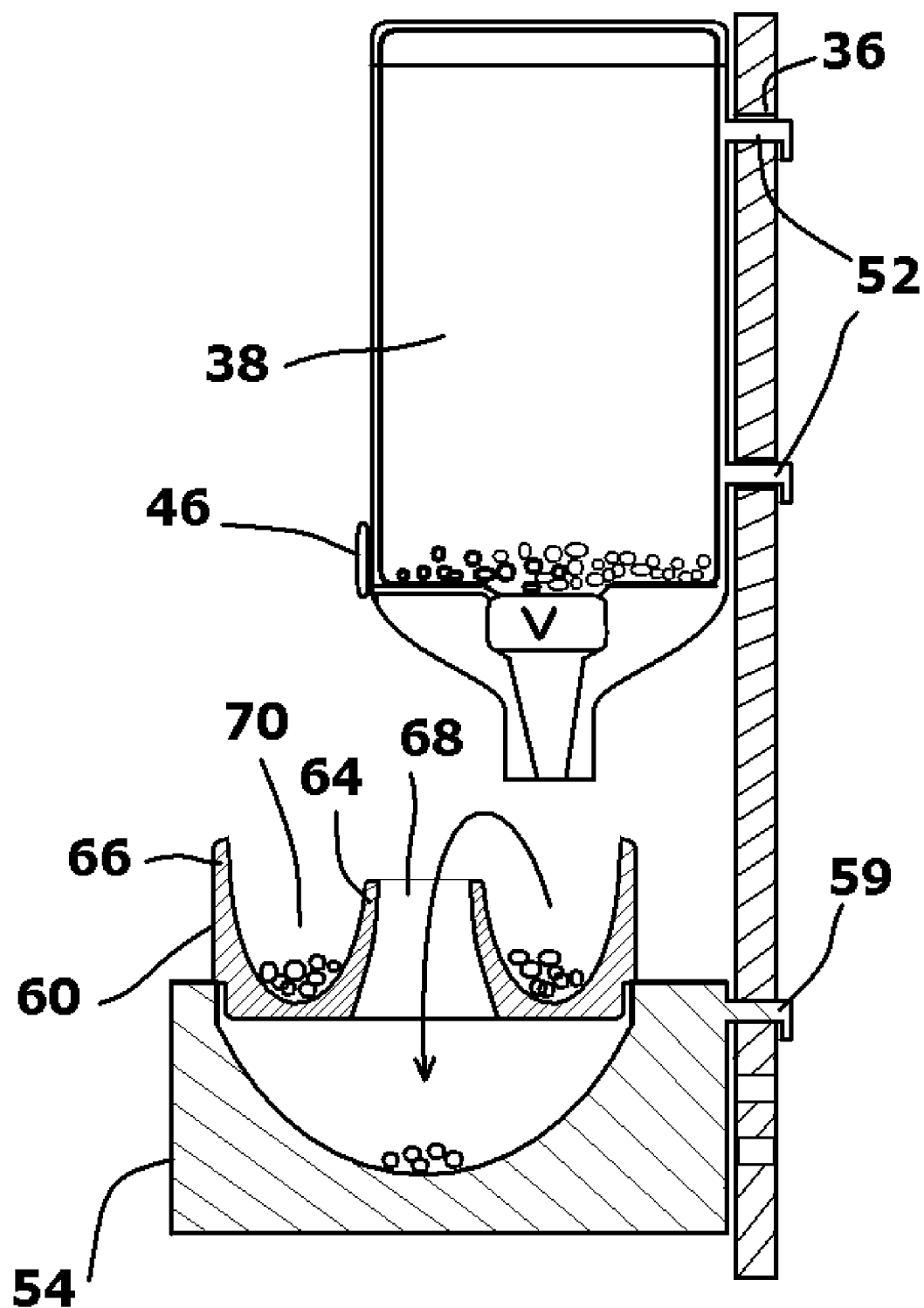
FIG. 3 is a cross-sectional side view of the exemplary embodiment of FIG. 1 viewed along section line 3-3.

Referring to FIG. 1, in conjunction with both FIG. 2 and FIG. 3, a dispensing system 10 is disclosed. The dispensing system 10 is used to provide food and/or water to a pet 12 that is traveling in the rear seat 14 of an automobile.

The dispensing system 10 is suspended on the back of one of the vehicle's front seats 18. The front seat 18 can be either the driver's seat or the passenger front seat. The dispensing system 10 utilizes a backboard 20. The backboard 20 is preferably rigid. However, a semi-flexible panel can also be used. The backboard 20 is attached to the front seat 18 using suspension elements 22. In the shown embodiment, the suspension elements 22 include two flexible straps 24, 26. However, it should also be understood that the suspension elements 22 could also be rigid linkages. The suspension elements 22 terminate with connectors 27, 28. The connectors 27, 28 mechanically engage the support posts 29 of the headrest 30, wherein the backboard 20 dangles behind the front seat 18 from the headrest 30. The suspension elements 22 are preferably adjustable in length so that the backboard 20 can be supported at different heights. The preferred manner of adjusting the length of the suspension elements 22 is to provide an adjustable attachment means between the backboard 20 and the suspension elements 22.

It will be understood that the two straps 24, 26 can be replaced with a single looped strap that passes around the headrest 30 like an apron string. A single loop strap is preferred if the front seat 18 has a non-adjustable headrest that is built into the structure of the front seat.

An optional lateral strap 32 may also attached to the backboard 20. The lateral strap 32 passes around the backrest of the front seat 18. The lateral strap 32 secures the backboard 20 to the front seat 18 and prevents the backboard 20 from swinging freely as the automobile is moving.

The backboard 20 has a mounting surface 34 that faces the rear seat 14 of the automobile. The backboard 20 contains a plurality of mounting receptacles 36 that extend into the mounting surface 34. The mounting receptacles 36 are used to selectively attach various elements to the backboard 20. Multiple sets of mounting receptacles 36 can be used to enable various elements to be adjusted in position as needed on the mounting surface 34 of the backboard 20.

One or more storage containers 38, 40 are provided. The storage containers 38, 40 are attached to the backboard 20. In the shown embodiment, two storage containers 38, 40 are provided. However, it should be understood that one, or any plurality of storage containers, can be mounted to the backboard 20. The limiting factors are the size of the backboard and the size of the storage containers being attached.

In the exemplary embodiment, two storage containers 38, 40 are used so that a pet traveling in the rear seat 14 of the automobile can be provided with both food and water. In the exemplary embodiment, one storage container 38 is for food, the other storage container 40 is for water. Each storage container 38, 40 has a top opening that is covered by a removable lid 41, 42. This enables the containers 38, 40 to be filled with food and/or water.

The food storage container 38 has a dispensing opening 44 positioned at the bottom of the food storage container 38. The flow of food through the dispensing opening 44 is dependent upon the manipulation of a mechanical valve 46. For dry food, the mechanical vale can be push button dispensing slot. When the mechanical valve 46 is opened, food from within the food storage container 38 can pass through the dispensing opening 44. The volume of food is dependent upon the length of time that the push button valve 46 is pressed.

Likewise, the water storage container 40 has a dispensing opening 48 that is positioned below the water storage container 40. The flow of water through the dispensing opening 48 is dependent upon the manipulation of a second mechanical valve 50. For water, the mechanical valve is a simple spigot valve. When the mechanical valve 50 is opened, water from within the water storage container 40 can flow through the dispensing opening 48. The volume of water is dependent upon the length of time that the mechanical valve 50 is pressed.

The food storage container 38 and the water storage container 40 can be permanently affixed to the backboard 20. However, it is preferred that both the food storage container 38 and the water storage container 40 be removable. In this manner, the food storage container 38 and the water storage container 40 can be removed, cleaned and/or refilled without having to remove the backboard 20 from the automobile.

To facilitate the attachment and detachment of the food storage container 38 and the water storage container 40 from the backboard 20, both the food storage container 38 and the water storage container 40 are provided with projections 52. The projections 52 enable the food storage container 38 and the water storage container 40 to selectively engage the mounting receptacles 36 on the backboard 20 in one or more positions.

A support tray 54 is provided. The support tray 54 defines deep bowl receptacles 56, 58. The number of bowl receptacle 56, 58 provided is dependent upon the number of food/water storage containers 38, 40 provided. In the exemplary embodiment, two storage containers 38, 40 are provided. As such, the support tray 54 defines two bowl receptacles 56, 58. The bowl receptacles 56, 58 are capable of retaining fluids without leaking. The support tray 54 also contains hook protrusions 59 that enable the storage containers 38, 40 to mechanically engage the mounting receptacles 36 on the backboard 20 in one or more positions.

A separate bowl is provided for both the food storage container 38 and the water storage container 40. The bowls include a food bowl 60 and a water bowl 62. The food bowl 60 and the water bowl 62 rest in the bowl receptacles 56, 58 in the support tray 54. Each of the bowls 60, 62 has an annular construction, having both an inner wall 64 and an outer peripheral wall 66 that are concentric. The inner wall 64 surrounds a central opening 68 that passes through the center of each bowl 60, 62. The outer peripheral wall 66 defines the periphery of each bowl 60, 62. A toric capture area 70 is disposed between the inner wall 64 and the outer peripheral wall 66. The capture area 70 is capable of holding a volume of water or food without leaking until the capture area 70 is full and overflows.

The inner wall 64 is slightly shorter than the outer peripheral wall 66. In this manner, if one of the bowls 60, 62 becomes overfull or if the contents of the bowls 60, 62 shift, then the overflow will tend to flow over the inner wall 64 before it flows over the outer peripheral wall 66.

If food or water overfills a bowl 60, 62, then the excess food/water will flow over the top of the inner wall 64 and into the central opening 68. The bowls 60, 62 sit within the bowl receptacles 56, 58 of the support tray 54. Consequently, when a bowl 60, 62 overflows through the central opening 68, the excess food/water collects in the bowl receptacles 56, 58 underneath. The excess food and/or water does not fall to the floor of the automobile 16. Rather, the excess food and/or water collects in the bowl receptacles 56, 58 where it can be reused or disposed.

As can be seen best in FIG. 3, since each of the bowls 60, 62 has a central opening 68, the bowls 60, 62 are not placed directly under the storage containers 38, 40. If this were so, the food and/or water falling toward the bowls would flow straight through the central openings. Rather, the bowls 60, 62 are positioned under the storage containers 38, 40 so that the capture area 70 of each bowl 60, 62 is positioned under the dispensing openings 44, 48 of the storage containers 38, 40. In this manner, when food and/or water flows out of the storage containers 38, 40, the food and/or water is caught by the bowls 60, 62. Furthermore, by positioning the capture areas 70 of the bowls 60, 62 under the dispensing openings 44, 48, the bowls 60, 62 are naturally shifted forward in front of the storage containers 38, 40. This provides open access to the bowls 60, 62 needed by pets eating and/or drinking from the bowls 60, 62.

In use, the backboard 20 is mounted to the rear surface of a vehicle's front seat 18. The storage containers 38, 40 are filled with water and/or food. The storage containers 38, 40 are attached to the backboard 20. Depending upon the type of automobile and the model of seats, the food storage container 38 and the water storage container 40 are mounted to the backboard 20 at a level that is higher than the sitting surface of the rear seat 14. The support tray 54 and bowls 60, 62 are attached to the backboard 20 under the storage containers 38, 40. Again, the height of the bowls 60, 62 is preferably higher than the height of the sitting surface of the rear seat 14. In this manner, when a pet 12 is sitting on the rear seat 14, it does not have to leave the rear seat 14 to reach the bowls 60, 62.

Food and/or water is dispensed into the bowls 60, 62. Usage by the pet 12 and movement of the automobile 16 inevitably causes spillage. Most all spillage passes into the central opening 68 in the center of each bowl 60, 62, where it is collected in the bowl receptacles 56, 58 of the support tray 54. Any spillage over the outer peripheral wall 66 of the bowls 60, 62 is captured on the top surface of the support tray 54. In either spill scenario, the food and/or water is caught by the support tray 54 and does not contaminate the automobile 16. When the pet 12 is removed from the automobile 16, the support tray 54 can also be removed and cleaned.

In the embodiment shown, suspension elements 22 are used to hold the backboard 20 of the dispensing system 10 to the rear of a vehicle's front seat 18. It will be understood that the dispensing system 10 can be removed from an automobile and attached to a regular chair in a house or a similar support at any other location. Likewise, it should be understood that the support tray 54 can be selectively removed from the backboard 20. The support tray 54 can be simply placed on the floor for use by a pet indoors. The bowls 60, 62 continue to prevent spillage in the same manner as was previously described.

Figure 4:
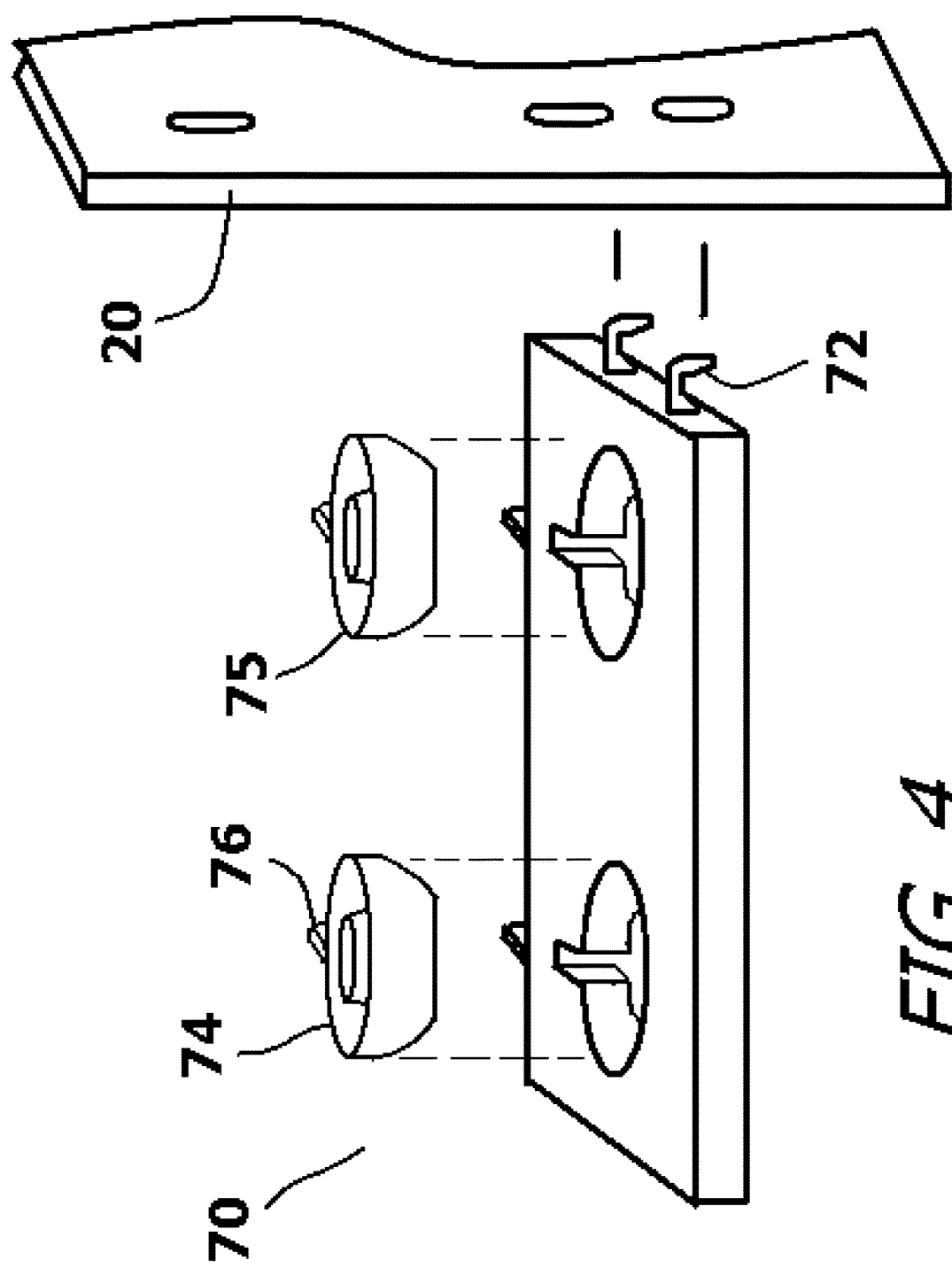
FIG. 4 is a first alternate embodiment of a bowl and tray subassembly for use with the present invention.

Referring now to FIG. 4, an alternate embodiment of a support tray 70 is shown. In this embodiment, the support tray 70 also has side protrusions 72. The side protrusions 72 enable the support tray 70 to be connected to the backboard 20 in an orientation that is perpendicular to the plane of the backboard 20. This causes the support tray to hold bowls 74, 75 away from the backboard 20 so that the bowls can be easily accessed by a pet sitting on the back seat of an automobile.

Also shown in FIG. 4 are alternate structures for bowls 74, 75. The bowls 74, 75 also have protrusions 76. The protrusions 76 enable the bowls 74, 75 to be mounted directly to the backboard 20 above the support tray 70 or without the support tray 70.

Figure 5:
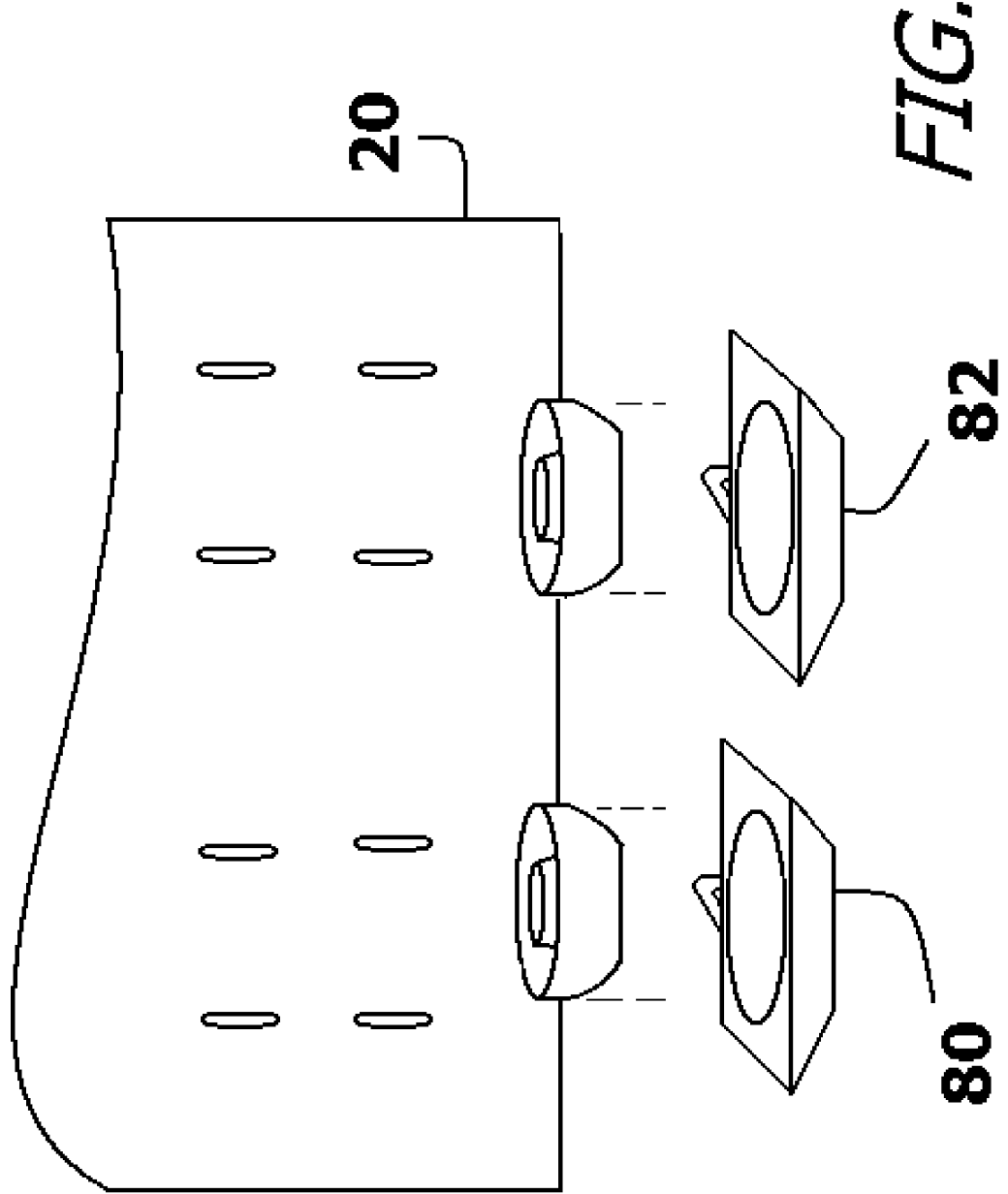
FIG. 5 is a second alternate embodiment of a bowl and tray subassembly for use with the present invention.

Referring now to FIG. 5, an alternate embodiment is shown. In this embodiment, a smaller support tray 80, 82 is provided for each of the bowls. The smaller tray assemblies 80, 82 can individually be mounted to the backboard 20.

It will be understood that the embodiments of the present invention that are illustrated and described are merely exemplary and that a person skilled in the art can make many variations to those embodiments. For instance, the shape of the backboard, tray and bowls can be varied as a matter of design choice. All such embodiments are intended to be included within the scope of the present invention as defined by the claims.

What is claimed is:

1. A dispensing system for use in a vehicle having a seat with a headrest, said dispensing system comprising:
   a portable backboard having straps extending therefrom for selectively connecting said backboard to said headrest of said seat, wherein said backboard dangles from said headrest via said straps;
   a container mounted to said backboard, wherein said container holds material and wherein said container has a first dispensing opening for dispensing said material;
   a tray mounted to said backboard; and
   a bowl supported by said tray, wherein said bowl is positioned proximate said first dispensing opening for receiving said material dispensed from said container.

2. The assembly according to claim 1, wherein said material held by said container is selected from a group consisting of water and pet food.

3. The assembly according to claim 1, wherein said bowl is annular in shape, having a central opening.

4. The assembly according to claim 3, wherein said bowl has an inner wall that surrounds said central opening and an outer peripheral wall.

5. The assembly according to claim 4, wherein said outer peripheral wall is taller than said inner wall.

6. The assembly according to claim 1, wherein said tray defines a receptacle that receives and retains said bowl.

7. The assembly according to claim 1, wherein said container selectively mounts to said backboard in one of a plurality of adjustable positions.

8. The assembly according to claim 1, wherein said tray selectively mounts to said backboard in one of a plurality of adjustable positions.

9. The assembly according to claim 1, further including a manually operated valve within said container for selectively dispensing said material from said dispensing opening.

10. A dispensing system for dispensing food and water to a pet in a vehicle that has a vehicle seat with a headrest, said system comprising:
    a food container for holding pet food, said food container having a food dispensing opening for dispensing said pet food;
    a water container for holding water, said water container having a water dispensing opening for dispensing said water;
    a food bowl;
    a water bowl; and
    a portable backboard that supports said food container, said water container, said food bowl and said water bowl; and
    suspension elements that extend from said portable backboard and engage said headrest of said vehicle seat, wherein said portable backboard is suspended below said headrest by said suspension elements.

11. The assembly according to claim 10, further including a lateral strap extending from said portable backboard for attaching said backboard to said vehicle seat.

12. The assembly according to claim 10, further including a tray mounted to said backboard wherein said tray supports said food bowl and said water bowl.

13. The assembly according to claim 12, wherein said tray contains receptacles for receiving and retaining said food bowl and said water bowl.

14. The assembly according to claim 12, wherein said tray is positionally adjustable on said backboard.

15. The assembly according to claim 10, wherein both said food bowl and said water bowl are annular shaped bowls that define central openings.

16. A dispensing system for dispensing food and water to a pet with a vehicle, said system comprising:
- a seat having a headrest;
- a backboard suspended from said headrest of said seat by at least one suspension element;
- a food container for holding pet food, wherein said food container is attached to said backboard, said food container having a food dispensing opening for dispensing said pet food;
- a water container for holding water, wherein said water container is attached to said backboard, said water container having a water dispensing opening for dispensing said water;
- two bowls, wherein a first food bowl holds food from said food container and a second water bowl holds water from said water container, wherein each of said bowls is annular in shape and defines a central opening; and
- a tray for positioning said first food bowl under said food dispensing opening, and positioning said second water bowl under said water dispensing opening, wherein said tray is attached to said backboard.

17. The assembly according to claim 16, wherein each of said two bowls has an inner wall that surrounds said central opening and an outer peripheral wall.

18. The assembly according to claim 17, wherein said outer peripheral wall is taller than said inner wall.

19. The assembly according to claim 16, wherein said tray contains receptacles for receiving and retaining said two bowls.

* * * * *